United States Patent [19]

Bongiorno

[11] 4,133,505
[45] Jan. 9, 1979

[54] RAILWAY SAFETY SYSTEM USING INTENSITY OF CURRENT

[76] Inventor: Domenico Bongiorno, Via Cavallotti, 53, Massa, Italy

[21] Appl. No.: 780,784

[22] Filed: Mar. 24, 1977

[30] Foreign Application Priority Data

Mar. 24, 1976 [IT] Italy .............................. 18302 A/76
Feb. 7, 1977 [IT] Italy .............................. 20006 A/77

[51] Int. Cl.² .............................................. B61L 3/10
[52] U.S. Cl. .................................. 246/167 D; 191/6; 191/2; 246/187 C
[58] Field of Search ........... 246/167 D, 187 C, 187 B, 246/182 B; 191/2, 3, 6

[56] References Cited

U.S. PATENT DOCUMENTS

3,410,996  11/1968  Carrino ............................ 246/187 C

FOREIGN PATENT DOCUMENTS

1291765  4/1969  Fed. Rep. of Germany ...... 246/167 D

*Primary Examiner*—Galen L. Barefoot
*Assistant Examiner*—Reinhard J. Eisenzopf

[57] ABSTRACT

A railway safety system uses intensity of current measurements in order that a train driver can have a continuous evaluation of the mutual distance between his train and the next one in front of or rear to it. Two ammeters give this indication by measuring the current intensity in the corresponding circuit encompassed on a resistive line parallel to the railroad, by the associate sliding contacts on both trains, since each train is provided with a pair of pantographs in contact with said resistive line and a generator of d.c. which thus flows in the circuit closed by two trains and comprising the half circuit in series with the concerned pantograph of each train and the intermediate length of resistive line. A reverser relay applies the voltage of the generator to either of the two half circuits of a train. Switch relays may be provided to operate acoustic signals and/or the automatic braking device at given values of the flowing current. Examples of how to calculate the resistance values of the half circuits and resistive line are given, according to the prefixed value of safety distance, the position of the pantographs and the possibility of frontal collisions in single-track railroads.

11 Claims, 9 Drawing Figures

RAILWAY SAFETY SYSTEM USING INTENSITY OF CURRENT

BACKGROUND OF THE INVENTION

This invention relates to a safety system for railways using intensity of current which provides almost complete protection from the possibility of collision while it allows a high level of rail traffic with an optimum coefficient of line utilization.

It is known that until now, for reasons of safety, the distance between trains travelling on the same rails could be measured by eye, time or space. The first measurement, entrusted to the driver, is only used in exceptional circumstances and at extremely low speeds. Time distancing, based on the departure of trains at fixed intervals does not guarantee against the danger of collision and has therefore to be integrated with other regulations, leading in any case to a rather low theoretical line capacity.

The so-called space distancing calls for suddivision of the line into sections marked off by signals, each of which can be occupied by a single train after it has been left free by the train immediately preceding it. The control of the freeing of a section can be carried out by a person or mechanically, using, for example a pair of axle-counter devices which compare the number of axles of a train as this enters and leaves a section, allowing a train to enter the section after this control. Automatic blocking systems also exist in which signals showing the track to be occupied are controlled from the trains by means of so-called "track circuits".

It is also known that all these safety systems are not entirely satisfactory because although they do not permit the optimum usage of the track they are notably expensive.

It should also be noted that the above methods apply to lines with double tracks each of which is occupied by trains going in the same direction, while on single track lines, where the same track is used for trains going in opposite directions, only by distancing can safety be guaranteed, obviously slowing down circulation even further.

SUMMARY OF THE INVENTION

It is the object of this invention to provide a railway safety system using intensity of current which aims to eliminate the above mentioned disadvantages of systems according to the prior art, enabling a particularly high level of safety to be attained and maintaining at the same time satisfactory traffic capacity of the line, even where single track traffic exists.

The railway safety system according to this invention gives the train driver a precise evaluation of the distance between his train and the one preceding it on the same track as well as the one following by means of indicators or recording instruments. By reading these instruments, also a stop point can be compared, with certain differences, to a stationary train in front and signalled as such.

In accordance with a particular aspect of the invention, an automatic and rapid blocking of the train without the manual intervention of the driver is effected when the instrument indicates that the distance from the preceding or nearest train falls below a predetermined value.

Also object of this invention is to supply a system for automatic regulation of rail traffic in railway stations.

These possibilities and advantages are obtained by using a system which is comprised substantially of apparatus installed on rolling stock as well as in fixed positions, in particular a resistive line parallel to the tracks.

For the above mentioned reasons, the railway safety system according to this invention is characterized by the fact that it comprises on each train a direct current generator, a reverser pulse relay to reverse the polarity applied by said generator on two half circuits the first of which, named "front half circuit" includes the coil of at least one relay, a resistor and an ammeter and the second, named "back half circuit" which includes a second ammeter identical to the first and a compensating resistor; as well as fixed installations including an electric resistive line parallel to the track, along which the current can only go in one direction, with a predetermined resistance per unit length on which two contacts, said "pantographs", per train glide to close across a length of the resistive line said two half circuits to form, for two adjacent trains on the same track, a circuit comprising said front half circuit of the train which follows and said back half circuit of the train ahead and travelling in the same direction or, in the case of two trains travelling towards each other, a circuit comprising the two front half circuits.

It should be noted that the resistive line mentioned above may be an aerial line or a so-called "third rail". In the first case the gliding contacts on the train are pantographs such as trolleys while in the second case they could be different, even though they will be called "pantographs" throughout the description which follows.

Before beginning a detailed description of the system according to this invention, a few remarks regarding the positioning of the pantographs will be discussed, above all insofar as the so-called "safety distance" is concerned in connection with which the blocking device on the train following is released.

This distance is calculated on the basis of the length of track needed for stopping the train plus a predetermined distance which should always exist between two stationary trains as a minimum limit. In the following the latter mentioned distance will be referred to as "working distance" and should be always taken into account so that the possible "tail" of the first train can be included therein, and so that the intensity of current in the closed circuit between two trains should not reach values such as to completely excite the reverser relay of the second train, which whould cause an unsuitable reversal of the relay contacts, followed after a short interval by another reversal and so on.

BRIEF DESCRIPTION OF THE DRAWINGS

These and further objects, advantages and characteristics of the railway safety system according to the present invention will result from the following detailed description of certain embodiments thereof given by way of a non-limiting example, with reference to the annexed drawings in which.

DETAILED DESCRIPTION OF THE PREFERRED EMBODIMENTS

Figure 1:
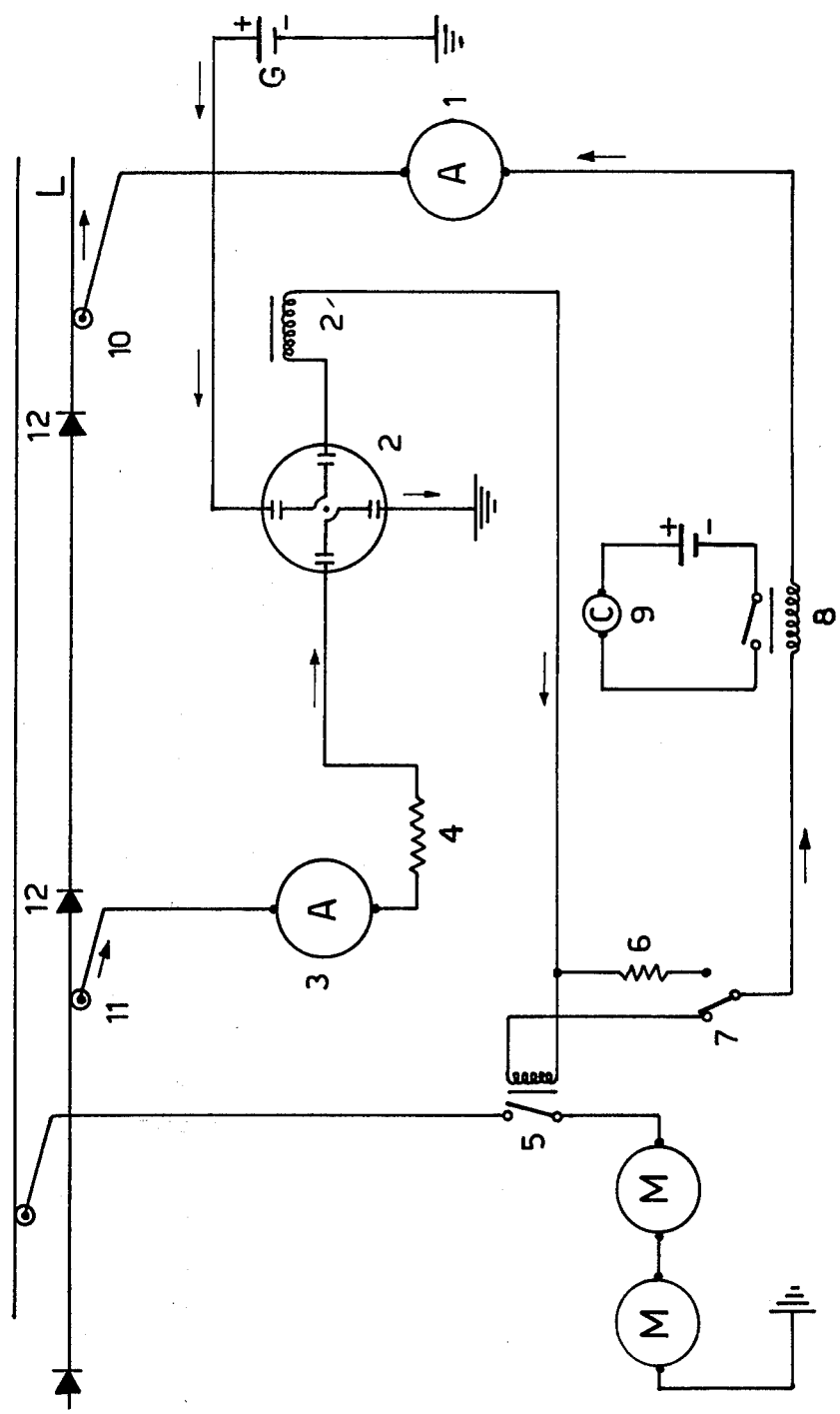
FIG. 1 shows a diagram of the circuit comprising the resistive line and apparatus installed on locomotives, as well as a simplified high voltage circuit for feeding the driving motors.

Referring to FIG. 1, the system according to this invention substantially consists of the apparatus mounted on the train, usually on the locomotive, comprising two ammeters 1 and 3, to measure the free distance respectively in front of and behind the locomotive, a generator G of direct current, a reverser pulse relay 2, a first switch relay 5 inserted in the high voltage line for feeding the two driving motors and a second switch relay 8 connected to the independent feeding of an acoustical signalling device 9. Obviously the driving motors can work other than with high voltage, in which case the switch 5 will act suitably on the motor feeding whatever it is. Two compensating resistors 4 and 6 are also provided as well as an electrical switch 7 for manual control.

Each of the two ammeters 1 and 3 is inserted in a half circuit with one end connected directly, through pantograph 10 or 11, to the resistive line L and the other end, through reverser relay 2, to a pole of the generator G. The relay 2 automatically reverses the polarity applied to the two half circuits by the generator G whenever it is required. In fact for the correct working of the system, the current applied to a half circuit should not be circuited by the other half circuit of the same apparatus. If this should happen, as if the current were flowing in line L of FIG. 1 in the opposite direction to that indicated, the circuit thus obtained would give a maximum intensity of current which can not be found in any other resistive connection and such to cause the complete exciting of the reverser relay 2 with the consequent reversal of the current applied to the circuit and the correct insertion required by the system. It should be noted that the resistive line L includes, at regular intervals, a rectifier and resistor in series in order to provide a line along which the current can flow in only one direction, and having a predetermined resistance in ohm/m, constant for all its length. As already mentioned, this resistive line can be a "third rail" parallel to the railroad, or an aerial wire line. In any case a series of relays will be also provided applied in certain positions on the resistive line, as will be explained better hereinunder, as well as a series of measuring instruments to be connected at fixed shunting positions and stations.

The two pantographs 10 and 11, as referred to in the broadest sense as mentioned above, are spaced apart according to a fixed distance which is slightly more than one section of the resistive line, that is the length between two successive rectifiers 12, so that there is at least one rectifier between two pantographs at any moment.

Considering separately the two half circuits relative to the pantograph 10 which will be referred to as "front pantograph" and the pantograph 11 named "back pantograph", in series to the pantograph 10 there will be: the moving iron ammeter 1 suitable to measure electric currents independently of their direction, a switch relay coil 8, a switch relay coil 5, or a resistor 6 according to the position of switch 7, as well as a reverser relay coil 2.

In the embodiment illustrated an ammeter 3 which is also of the moving iron type, is connected in series to the back pantograph 11, and a compensating resistor 4 is connected as well. This resistor is necessary since, in a first embodiment of the system according to the present invention it will be assumed that the total resistance of the elements in series with the front pantograph is equal to the total resistance in series with the back pantograph and also equal to that of all other half circuits of the apparatus mounted on trains running on the same tracks.

Considering a numerical example and assuming that the resistance of elements in series in the half circuit of the pantograph 10 have the following values: ammeter 1:3 ohm, relay 8:9 ohm, resistor 6:7 ohm, relay 2:6 ohm, the total resistance will be 25 ohm for either of the two positions of the switch 7. As the ammeter 3 also has a resistance of 3 ohm, it can be deduced that the value of the compensating resistance 4 should be 22 ohm.

Considering then a specific resistance R1 of the line L amounting to 50 ohm/Km along the direction in which the current flows and applying the voltage of the generator G, whose negative pole is constantly earthed through the framework of the locomotive, to he fixed contacts of the reverser relay 2, no electric current will be circulating in either of the two half circuits if the connection is the correct one illustrated in FIG. 1, while in the case of a wrong connection, a circuit will be obtained in which current is equal to the voltage of the generator, e.g. 100 V, divided by the sum of the resistance of the front half circuit, the back half circuit and the resistive line. This last resistance depends on the legth of line circuited by the two pantographs: if it is for example 15 m, we can have:

$$I = \frac{100}{25 + 25 + \frac{50}{1000} \times 15} = \frac{100}{25 + 25 + 0.75} = \frac{100}{50.75} = 1.970 \, A$$

The reverser relay 2 should be constructed in such a manner as to excite and reverse the contacts only when the intensity of current passing therethrough reaches a value which is near to 1.97 A, for example between, 1.80 and 1.97 A. As will better be described hereinunder, this intensity can be reached only in the last described circuit, so that the reversing of the circulating current direction will depend exclusively on the wrong polarity of the pantographs.

Figure 2:
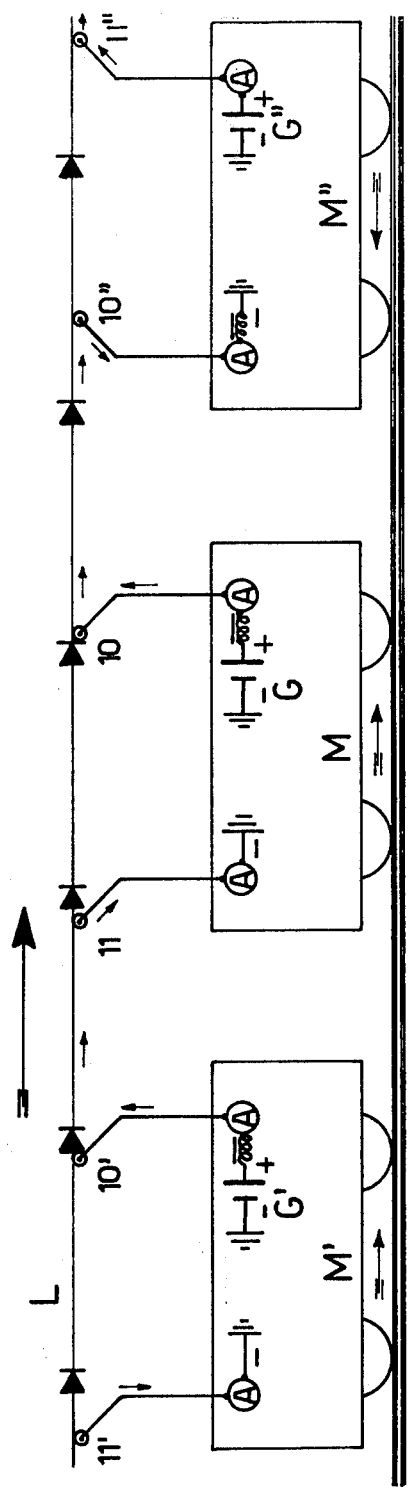
FIG. 2 shows a diagram of three consecutive trains in movement on the same track and the respective circuits closed by them on the resistive line.

Referring now to FIG. 2, where the three vehicles M, M' and M" are shown, the last of which runs along the track in the opposite direction to the other two and comes toward M, the half circuit of the front pantograph 10' of M' is completed by the half circuit of the back pantograph 11 of M while the half circuit of the front pantograph 10 of M is completed with the half circuit of the front pantograph 10″ of M″. The apparatus of the three units are in fact connected by means of the same resistive line L in a fixed direction and the current sent by pantograph 10′ cannot enter the circuit between the front pantographs of M and M″ because of the voltage drop existing along the resistive line between the pantograph 11 and point of insertion in the line of a voltage of the same polarity and greater value through pantograph 10. Since the electric current from pantograph 10 cannot enter the circuit between the pantographs 11 and 10′ because of the rectifier inserted between the pantographs of the unit M, having a distance, as already mentioned, always greater than the length of a section of the line L, the intensity of current circulating in a circuit closed between two vehicles is equal to that obtained when dividing voltage V of the generator by the sum of the resistances of the two half circuits and the length of resistive line circuited between the two closest pantographs of the two units.

Referring again to the numerical example given above, the total resistance of the two half circuits is 25 + 25 = 50 ohm and the intensity of current circulating is varied only by the value of the resistance R1 of the line encompassed by the two pantographs. The results are the following:

for a distance of 1 Km:

$$100/(50 + R1.1 \text{ Km}) = 100/(50 + 50) = 1 \text{ A}$$

for a distance of 2 Km:

$$100/(50 + R1.2 \text{ Km}) = 100/(50 + 100) = 0.666 \text{ A}$$

and so on, using the same method:
3 Km = 0.5 A; 4 Km = 0.4 A; 5 Km = 0.333 A; 6 Km = 0.285 A.

It is thus obvious that the intensity of current revealed by the ammeters of each unit is inversely proportioned to the reciprocal distance. By suitably setting the ammetric scales with the length units corresponding to the formula written above, it will be possible to read the mutual distances directly from the instruments.

The safety system according to this invention however is not limited to the signalling if distance between trains. In fact, by constructing the relay 8 of FIG. 1 in such a way as to close the circuit to which it is applied, when a predetermined minimum current intensity flows through its coil, for example 0.285 A corresponding to a distance of 6 Km in the example given above, an acoustical signalling device 9 comes into action when the distance between the two adjacent vehicles falls below 6 Km. Furthermore by adjusting relay 5 in such a way that it opens the high voltage feeding circuit and simultaneously closes the circuit which releases the braking apparatus when an intensity of current not less than that corresponding to a predetermined distance (4 Km) flows through its coil, the rapid stopping of the locomotive is obtained. As a matter of fact the locomotive driver can avoid rapid braking and cause his vehicle to stop at the 2 Km "working distance" from the train in front by starting to operate normal braking apparatus at the 6 Km distance signalled acoustically and watching the distance indicator. At the same time, by hand-operating the switch 7, he would deviate the current applied to the relay coil 5 on the resistor 6. This deviation should be obtained preferably by actuating the switch 7 manually so that, when released, it will be returned to its previous position by a spring thus ascertaining that the exclusion of the rapid braking system is always under the driver's control.

Figure 3:
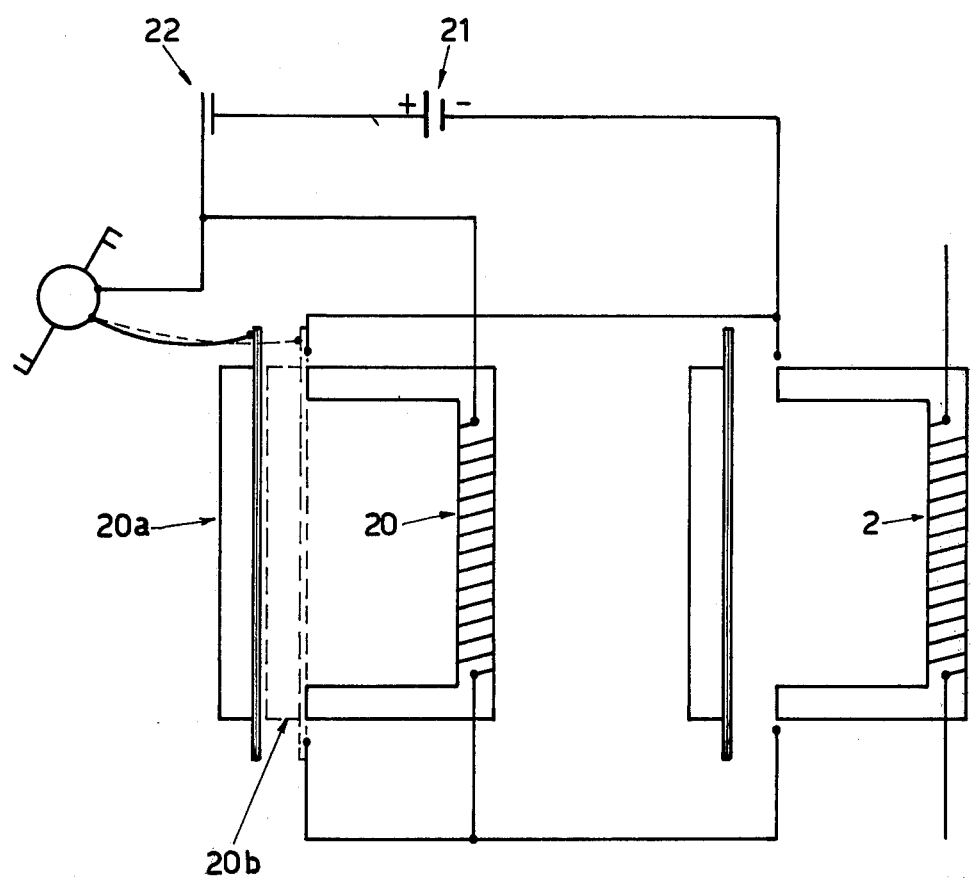
FIG. 3 in more detail a preferred embodiment of the circuit in which the reverser relay 2 of FIG. 1 is connected.

Referring now to FIG. 3, this shows in detail the circuit in which the reversing relay 2 of FIG. 1 is preferably inserted. If, in fact, this relay were constructed and connected in the traditional manner, the attraction of the movable keeper by the excited relay would also cause the momentary interruption of the circuit and thus of the electric current feeding the relay coil which, unexcited, would cause the keeper to return to its primary position and so on, without ever being able to complete the attraction of the keeper and reversal of contacts. Instead, the circuit illustrated in FIG. 3 is suitable to take advantage of the moment of maximum current utilizing an auxiliary relay 20, with keeper at rest 20a and attracted 20b represented by dotted line, as well as auxiliary generator 21 and a time switch, for example of bimetallic plate, which causes a delay of about two seconds. This embodiment of the reverser relay is also useful in order to momentarily interrupt the circuit obtained by a possible wrong insertion during the reversal operation, in such a way as to liberate the keepers of the relays 5 and 8 of FIG. 1 from their respective magnetic cores once the current intensity has a value lower than intervention level.

Preferably also relay 5 should not be inserted directly into the high voltage line as a switch but into an auxiliary circuit which feeds another time relay (not shown) which in turn has a switch connected to the high voltage line and another one connected to the control circuit of the braking device. Obviously by applying a return spring of adjustable force to the keeper of relays 5 and 8, the relay intervention can be preset at different distances, which are better suited to the type and maximum speed of the locomotives on which they are installed.

Figure 4:
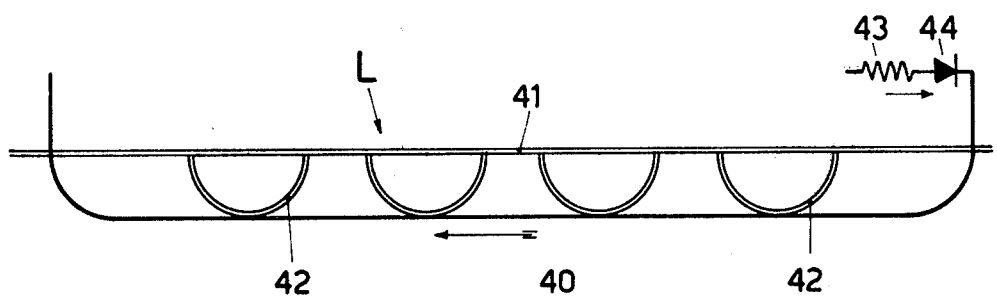
FIG. 4 shows the layout of a section of the resistive line.

FIG. 4 illustrates the layout of a section of the aerial type of resistive line, consisting substantially of a bare conducting wire 40 which, with a sustaining line 41 and insulations 42, runs along the whole of the track of each railway line. The line L is installed in a vertical plane parallel to either of the tracks at a height about 50 cm lower than that of the high voltage feed line vertically located along the midline of the track, so that the high voltage pantograph can run without ever touching the resistive line. The gliding contact of the resistive line will be of such a width as to ensure maintenance of the contact with the resistive line to the right or left of the track, while the feed pantograph or trolley will be narrower. The constant value of resistance per length unit can be obtained by using a wire with a suitable cross-section and if the required cross-section does not fulfil the mechanical resistance requirements and the strength to which the line is subjected, by inserting resistors 43 at regular intervals. At these intervals selenium —, or similar, — based rectifiers 44 should be inserted so that direct current flows in one direction only. The line L should be electrically insulated from all that surrounds and contains it, and its sections should be insulated from each other so that the current which flows therethrough has necessarily to pass through the rectifiers and relative resistances only.

Figure 5:
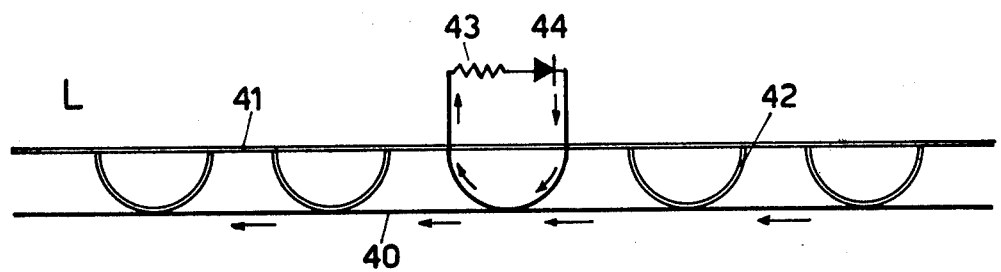
FIGS. 5 and 5a show respectively a front view and a top view of the connection in series of two adjacent sections of line.
Figure 5A:
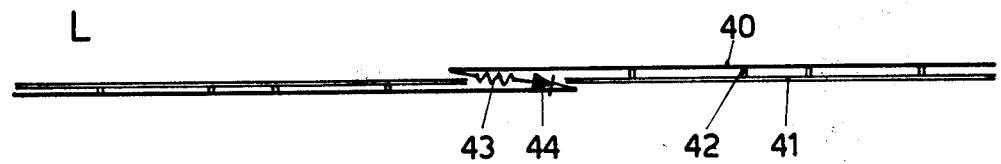

In FIGS. 5 and 5a the connection between two adjacent sections of resistive line is shown in detail.

Figure 6:
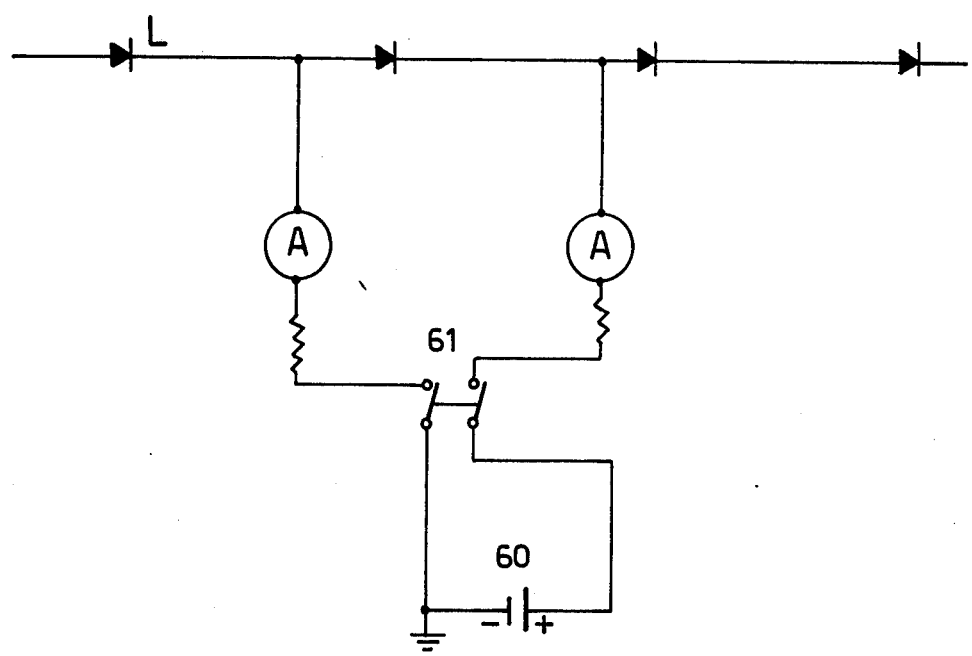
FIG. 6 shows a diagram relating to the connection of two half circuits on the line, at a position where it is desired to stop a train and to know the distance between the coming train and said position.

Referring now to FIG. 6 there is shown a diagram of the circuit which closes on the line at a fixed place where the train must stop, for example stop stations for which it is advisable to know distance from the coming train. The resistors connected in series with the ammeters, which have an internal resistance of 3 ohm, amount to 117 ohm for a total of 120 ohm, which is the value of resistance needed to send a coming train a signal which is 1900 m more than the effective distance of the train in order to avoid the need to respect the minimum safety distance, for example 2 Km when including the wagons of the preceding train, in the case of a block point or station. Using this system in practice the train driver stopping at 2 Km as read on the instrument scale (limit to be always respected) will be actually only a few meters from the stopping point, but always at an effective distance of 2 Km from the locomotive of the preceding train, according to the cause for the stoppage. It must be noted that the polarities of generator 60 indicated in FIG. 6 should be the opposite of those indicated if the current flows along the line L in the direction opposite to that shown. The two half circuits can be connected and disconnected simultaneously on a line by means of a double switch 61.

Figure 7:
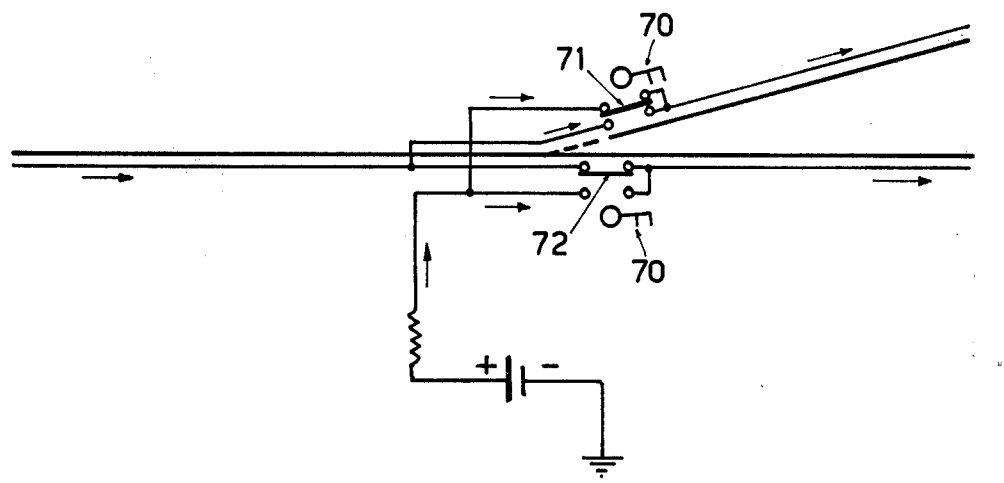
FIG. 7 shows the diagram of a track-switch zone with the connections of the resistive line for the safety system according to the present invention.

FIG. 7 shows a diagram of the circuit connections in correspondence with a shunting point. It is necessary that the two resistive lines of two tracks converging into a point be connected in such a way as to form a single resistive line while the terminal of the resistive line relative to the track which is to be disconnected from the shunting point (blind track) should be connected to a half circuit with a polarity dependent on the flow direction of the current in the line so as to block the way of any coming train. These connections can be obtained automatically by utilizing the two positions which can be assumed by the arms of a rail switch to open or close a circuit feeding two relays 70 having their contacts 71 and 72 connected to the resistive line as represented in the figure, obtaining thus, at the same time as the moving of the arms of the switch, the correct line connection. Also in this case the half circuit connected to the terminal of the resistive line corresponding to the interrupted track has a resistance in series of 120 ohm. To facilitate the connections between one line and the other in correspondence with switches it is convenient for the electric current in the parallel resistive lines of two or more tracks to circulate in the same direction.

Figure 8:
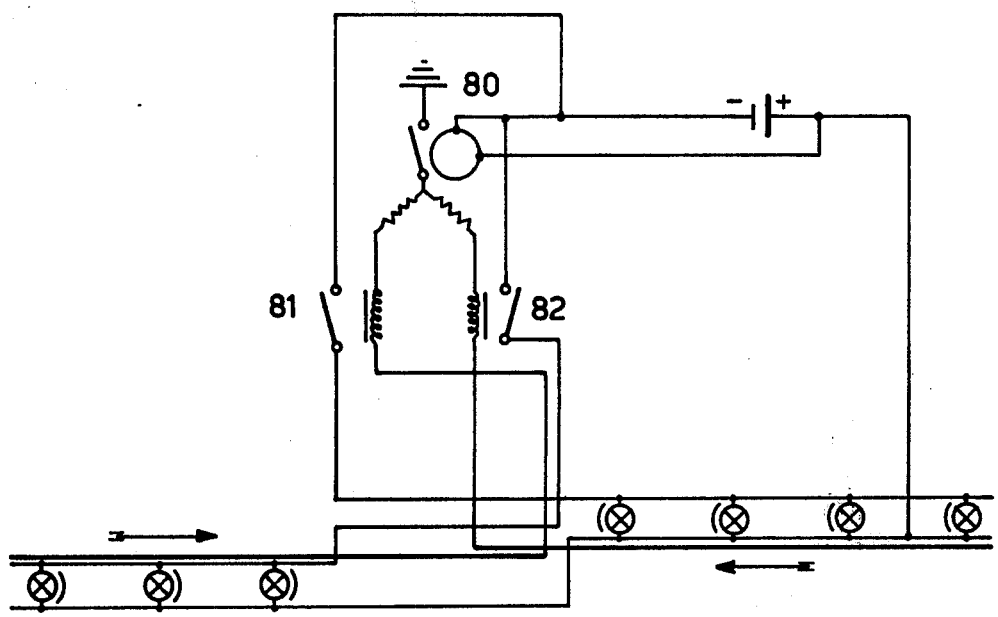
FIG. 8 shows a diagram of the connection required at the junction position of two resistive lines having an opposite current flow direction.

Sometimes, however, a resistive line may have to join up with another wherein the current flows in the opposite direction. In this case the connection is carried out as illustrated in FIG. 8, bearing in mind that for a better traffic flow these connections will be as few as possible and far from rail switches and connections. With reference to the figure, the positive ends of the two lines, instead of being directly connected are connected to two half circuits earthed by insertion of an intermittent switch 80, adapted to continuously open and close the contacts at regular intervals. The total resistance value of each of the two half circuits is higher than that of each half circuit of the locomotive pantographs. In each half circuit of FIG. 8, in fact, a resistance of 50 ohm has been inserted which, added to the resistance of the corresponding switch relay 81, 82 equal to 5 ohm, gives a total resistance of 55 ohm, which is 30 ohm more than the value of the total resistance of each of the half circuits of the pantographs, equal to 25 ohm in the example given above. This is in order to avoid the unsuitable reversal of the current of apparatus in a locomotive approaching the intersection point of the two lines if each half circuit in FIG. 8 were to have a total resistance of not more than 25 ohm. With the additional 30 ohm resistor as mentioned, the indication of the distance which the two half circuits give to the locomotive in transit will be 600 m more than the effective distance. Supposed that the two relays 81 and 82 close their contacts when a minimum current of 0.285 A, corresponding to 6 Km and therefore 5400 m in fact, flows through their coils, the flashing would be obtained of the red traffic lights installed along the resistive line track opposite to that to which the running train is connected. Also the signalling of a distance from a coming train would be given in an intermittent form as well as the acoustic signal, and the driver could continue to run by moving the lever of switch 7 to exclude the rapid braking system if the traffic lights on the run track indicate a free line. In this regard, with the arrangement of FIG. 8 the control circuit for the rapid braking should also be modified so that the stoppage of the train does not take place in a abrupt manner, which should burn the motor of the locomotive. To this end it is sufficient for relay 5 to be a time relay as illustrated in FIG. 3 for relay 2 so that its keeper in the attracted position also closes the coil feed circuit which coil will remain excited even when relay 5 opens the circuit. The release of the time relay keeper will only take place by interrupting the coil feed circuit with a manual switch. The intermittent switch 80 should have a contact closing time longer than the excitement time of the relay, e.g. 2".

The particular case of signal line tracks where the trains could run towards each other as for example M and M" in FIG. 2, should now be taken into closer consideration. Before entering into this argument it is better to return to the idea of the "working distance" also according to the pantograph position on the train, which could be placed, not both on the locomotive but in particular the back one could be located on the "tail" of the train or even in an intermediate position. The primary advantage of this solution would be the possibility of measuring the distance between the forepart of a train and the rear part of the preceding train, whereas a second advantage would be the possibility of proportionally lengthening the resistive line sections which, as previously mentioned, cannot be longer than the distance between two pantographs.

In any case, the minimum value of the working distance should always be greater than the distance between two pantographs on a single train and namely equal to that distance plus the length of resistive line sufficient to reduce the intensity of flowing current to a value which is near to, but lower than the value necessary to operate the reversing relay.

Bearing this in mind, it must be taken into consideration that the idea of using the same resistance values in both front and back half circuits as mentioned above can be adopted conveniently only on double track lines in which each track is used by trains travelling in the same direction. In fact, while with the above lines and that system it would be possible to reduce the safety distance between trains, in accordance with which the braking system would work, to the minimum indispensable so that the traffic capacity of the lines is increased; on the single line tracks, on the contrary it will be necessary to use a greater safety distance in order to ensure the possible stopping of two trains running towards each other thus causing a proportional decreasing of traffic capacity of the line. It is desirable therefore to use safety systems which allow the use on the same line of the shortest possible safety distance to avoid collisions and to obtain the maximum traffic capacity when trains are running in the same direction, as well as a distance much longer when the trains on the line are running towards each other since, as it is shown in FIG. 2 wherein a circuit is caused to close between the two front pantographs 10 and 10" of two vehicles M and M" running towards each other, the intensity of current circulating in this circuit should be higher than that which would be in a circuit closed at the time distance between a front half circuit and a back half circuit, that is between two trains travelling in the same direction. This cas be obtained by making the total resistance in said front half circuit of each train lower than the total resistance of the back half circuit of each train, with the same values for all the trains travelling on the same line.

A numerical example will show how it is possible, by using either of the above-mentioned different combinations of half circuits in closing a circuit between two adjacent trains to present the safety distance between trains in relation to their mutual direction.

In the following example we will use, between trains going in the same direction and with the same 100 V direct current generator a safety distance of 3 Km of which 2 are necessary to stop the colliding train at its maximum speed and 1 Km is the "working distance" as defined above, in order to obtain in the circuit, at said safety distance a current intensity of 0.5 A sufficient to release the braking system of the colliding train.

Before calculating the total resistance of the two half circuits of the resistive line and in relation to a predetermined safety distance it is convenient to calculate first the total resistance Rt which the circuit encompassed by two trains should have, i.e.:

$$Rt = V/A = 100/0.5 = 200 \text{ ohm}$$

Wishing to use a greater safety distance for trains running towards each other we should also obtain at this distance a circuit having a total resistance of 200 ohm at maximum, in order to have a current intensity of not less than 0.5 A which is enough to release the stopping devices of both trains.

Hereinunder the term circuit 1 will be used to define the circuit associate to the safety distance adopted for trains travelling in the same direction and circuit 2 that associate to the safety distance adopted for trains travelling towards each other.

It is however a condition, in order to obtain in circuit 2 the same total resistance as circuit 1 that the total resistance of the resistive line circuited by the front pantographs in circuit 2 is not higher than the total resistance of circuit 1.

Because of this condition it follows that the resistive line should have a resistance ohm/Km as much lower as the safety distance to be used between trains running towards each other is greater.

In the following calculations the abbreviations used are as follows:
C1 = circuit 1
C2 = circuit 2
Rt = total resistance
Rt1 = total resistance of the circuited length of resistive line
Rpa = resistance of the front half circuit
Rpp = resistance of the back half circuit
R1 = resistance of the resistive line per Km length If the safety distance relative to the circuit 2 is made twice that of circuit 1 (i.e. 2 × Km 3), the resistive values of the different elements, using the maximum allowable resistance for the resistive line circuited in circuit 2 as a basis for the calculations (since such a resistance should not be higher than the total resistance of circuit 1), it will be:

$$Rt1\ C2 = 200 \text{ ohm}; R1 = Rt1\ C2/Km\ 6 = 200/6 = 33.333 \text{ ohm/km}$$

$$Rt1\ C1 = Km\ 3 \times 33.333 = 100 \text{ ohm}$$

Because Rt of C2 should be equal to 200 ohm, Rpa will be:

$$(Rt\ C2 - Rt\ C2)/2 \text{ i.e. } (200 - 200)/2 = 0 \text{ ohm}$$

$$Rt\ C1 - Rt1\ C1 - Rpa = 200 - 100 - 0 = 100 \text{ ohm}$$

In conclusion we can say:

$$Rt\ C1 = R1 \times 3\ Km + Rpa + Rpp = 33.333 \times 3 + 0 + 100 = 100 + 0 + 100 = 200 \text{ ohm}$$

$$Rt\ C2 = R1 \times 6\ Km + Rpa + Rpa = 33.333 \times 6 + 0 + 0 = 200 + 0 + 0 = 200 \text{ ohm}$$

Taking instead for example as a basis for the calculations, the total resistance of the resistive line of circuit 2 as equivalent to 180 ohm, i.e. lower than the maximum allowable (200 ohm) the resistive values of the various elements inserted in the circuit would be:

$$Rt1\ C2 = 180 \text{ ohm}; R1 = Rt1\ C2/Km\ 6 = 180/6 = 30 \text{ ohm/Km}$$

$$Rt1\ C1 = Km\ 3 \times R1 = 3 \times 30 = 90 \text{ ohm}$$

$$Rpa = (Rt\ C2 - Rt1\ C2)/2 = (200 - 180)/2 = 10 \text{ ohm}$$

$$Rpp = Rt\ C1 - Rt1\ C1 - Rpa = 200 - 90 - 10 = 100 \text{ ohm}$$

In conclusion we could say:

$$Rt\ C1 = R1 \times Km\ 3 + Rpa + Rpp = 30 \times 3 + 10 + 100 = 90 + 10 + 100 = 200$$

$$Rt\ C2 = R1 \times Km\ 6 + Rpa + Rpa = 30 \times 6 + 10 + 10 = 180 + 10 + 10 = 200 \text{ ohm}$$

However, even if the safety distance relative to circuit 2 were to have three times or four times, etc. as much as the value relative to circuit 1, it would always be possible, utilizing the same calculation process used in the above examples, to determine the different values in order to obtain in circuit 2 at a distance being three times or four times, etc. as much as the safety distance, the same total resistance of the circuit 1.

The particular arrangements to conform with, if a safety distance should be adopted which is little more than the minimum indispensible for trains travelling towards each other on the same line, are:
(1) Inserting the reversing relay coil 2 in the back half circuits instead of the front ones as represented in FIG. 1.
This is necessary in order that the high intensity of current which would flow in such a circuit owing to the lower resistance of the front half circuits and the relative proximity of both trains, should not cause the reversing relays to invert the current flow; which in this case is not necessary.

In practice, however, it is advisable that between two stationary trains in front of each other even without considering the working distance, there will be at least a certain space so that the generator which feeds the encompassed circuit is not almost short-circuited.

(2) Giving the front half circuit a resistance value of zero or at least negligible so that the intensity of current flowing in a circuit closed between two trains travelling towards each other does not absolutely interfere with the intensity of current flowing in a second circuit closed by the back half circuit of one of the said trains and a front half circuit of a third train.

In fact if the above mentioned resistance of the front half circuits were not limited to said values, two trains travelling towards each other should stop at a distance equal to the minimum safety distance plus a distance corresponding to a length of the resistive line having a ohmic value slightly higher than that obtained by subtracting from the total resistance of the back half circuit the total resistance of the front half circuit and the total resistance of the length of resistive line corresponding to the distance between two pantographs mounted on the same train.

What I claim is:

1. A railway safety system comprising on each train driving motors, a generator of direct current, a reverser pulse relay to reverse the polarity applied by said generator to two half circuits, the first of which, called "front half circuit", comprises the coils of at least one switch relay, a resistor and an ammeter and the second of which, called "back half circuit", comprises a second ammeter identical to the first and a compensating resistor; as well as fixed installations comprising a resistive line, parallel to the line of the track and along which current can travel in one direction only and having a predetermined resistance per length unit, along which two contacts per train will glide, called "pantographs", suited to close on a length of resistive line said two half circuits whereby, for each two adjacent trains on the same railway track, a circuit is formed comprising said front half circuit of the train which follows and said back half circuit of the train which goes ahead in the same direction or, in the case of two trains travelling towards one another, a circuit comprising the two front half circuits, said front half circuit further comprising a manual switch with two positions, the first of which leads to the connection of the coil of one of said switch relays in said half circuit and the second causes, in alternative, the connection of a resistor having the same resistance as said coil.

2. A railway safety system according to claim 1, in which the total resistance inserted in each front half circuit is equivalent to the resistance inserted in each back half circuit, and has the same value for all trains travelling along the same track.

3. A railway safety system according to claim 1, in which the total resistance in said front half circuit of each train is lower than the total resistance in said back half circuit of each train, such resistances being equivalent for all trains travelling along the same track.

4. A railway safety system according to claim 3, in which the coil of said reverser relay is inserted in said back half circuit.

5. A railway safety ystem according to claim 3 in which the value of the total resistance of said front half circuit is not negligible in calculation of the values of the various resistive components, being comparable with these latter.

6. A railway safety system according to claim 5, in which the difference between the total resistance of the back half circuit and the front half circuit is slightly lower than the value of the total resistance of the resistive line circuited between the two nearest pantographs of two stationary trains (minimum safety distance) added to the value of the line resistance relevant to the distance between both pantographs mounted on the same train.

7. A railway safety system according to claim 1 in which the total resistance of said front half circuit is zero or has a negligible value.

8. A system according to claim 1, in which said switch relay has a contact connected to a high voltage feed of the driving motors.

9. A system according to claim 1, in which the coil of said reverser relay is inserted in said front half circuit through a self-powdered circuit and an auxiliary relay suited to maintain the excitement of the reversing relay coil during the attraction of the keeper.

10. A safety system according to claim 1, in which said resistive line is an aerial wire divided into mutually independent sections having a length shorter than the distance between the two pantographs on the same train, a resistance with a fixed value as well as a known current rectifier such as a diode being inserted in each section to make the current circulate in the same direction as in the adjacent sections.

11. Safety system according to claim 1, in which said resistive line is a third track parallel to the railway tracks being run.

* * * * *